(12) United States Patent
Liu et al.

(10) Patent No.: US 8,510,345 B2
(45) Date of Patent: Aug. 13, 2013

(54) GENERATING A SERVICE-ORIENTED ARCHITECTURE POLICY BASED ON A CONTEXT MODEL

(75) Inventors: Xin Peng Liu, Beijing (CN); Xi Ning Wang, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/469,230

(22) Filed: May 11, 2012

(65) Prior Publication Data

US 2012/0284386 A1     Nov. 8, 2012

Related U.S. Application Data

(62) Division of application No. 12/268,553, filed on Nov. 11, 2008, now Pat. No. 8,266,184.

(30) Foreign Application Priority Data

Nov. 23, 2007 (CN) .......................... 2007 1 0187088

(51) Int. Cl.
*G06F 17/30* (2006.01)
(52) U.S. Cl.
USPC .......................................................... 707/802
(58) Field of Classification Search
USPC .......................................................... 707/802
See application file for complete search history.

(56) References Cited

U.S. PATENT DOCUMENTS

| | | | |
|---|---|---|---|
| 7,428,582 B2 | 9/2008 | Bean et al. | |
| 2007/0168479 A1 | 7/2007 | Bean et al. | |
| 2007/0233457 A1 | 10/2007 | Kang et al. | |
| 2009/0055432 A1 | 2/2009 | Smith et al. | |

*Primary Examiner* — Hung Q Pham
(74) *Attorney, Agent, or Firm* — Cuenot, Forsythe & Kim, LLC

(57) ABSTRACT

A solution for generating a Service-Oriented Architecture (SOA) policy based on a context model is provided, which generates an application scope of the SOA policy; generates a context model; generates an action list for the context model based on action semantic modules customized by a user; generates a condition part of the SOA policy according to the context module; generates an action part of the SOA policy according to the action list; and combines the condition part and the action part to generate the SOA policy.

12 Claims, 10 Drawing Sheets

GENERATING A SERVICE-ORIENTED ARCHITECTURE POLICY BASED ON A CONTEXT MODEL

CROSS-REFERENCE TO RELATED APPLICATIONS

The current application claims the benefit of co-pending Chinese Patent Application No. 200710187088.2, titled "Method and apparatus for generating a service-oriented architecture policy based on a context model", which was filed on 23 Nov. 2007, and which is hereby incorporated by reference. This application is a Division of U.S. application Ser. No. 12/268,553, filed on Nov. 11, 2008.

TECHNICAL FIELD

The present invention relates to a Service-Oriented Architecture (SOA) of a computer network system, particularly to a method and apparatus of generating a context model for generating a SOA policy and a method and apparatus for generating a SOA policy based on the context model.

BACKGROUND OF THE INVENTION

Service-Oriented Architecture (SOA) is a software system architecture that is realized by connecting independent functional entities capable of completing specific tasks to meet requirements of business integration in an Internet environment. In other words, the SOA is a component model that links different function units (called services) of an application through interfaces and contracts properly defined among these services, wherein the definition of the interfaces is independent from the hardware platform, operating system and programming language for realizing services. The SOA uses the service-oriental modeling technique and WEB service technique to accomplish loose coupling between systems and thus realize integration and cooperation between the systems.

The SOA policy is an important component of the SOA system and is used for declarative description and execution of the SOA system behavior. In the SOA system, the usage of the SOA policy spans different phases across the SOA lifecycle, including design time validation, deployment time policy publication and package and runtime service selection, change management and impact analysis.

Generally, the SOA policy can be classified into the following types in different layers:
  Business policy for business decision making and industry guideline compliance, etc.
  Application policy for service selection during service invocation, etc.
  Governance policy for enforcing rules for standards compliance, and defining system behaviors for governance process, etc.

A main feature of SOA is that all the data and contexts are described in XML language, and a document containing such data and the contexts is called a SOA metadata document. Generally, the SOA metadata document can include: a service metadata document for describing content relating to a service, a runtime information document for describing content relating to the runtime information, and a document for describing other business content. For example, the service metadata document may use Web Service Description Language (WSDL), XML Schema Definition (XSD), Web Service Policy (WS-Policy), Service Component Definition Language (SCDL), Business Process Execution Language (BPEL), Service Component Architecture (SCA) policy, etc. The runtime information document may use Simple Object Access Protocol (SOAP), Representational State Transfer (REST), etc. The document for describing other business contents may use Service Data Object (SDO), Web Ontology Language (OWL), etc.

Several solutions for generating the SOA policy in the prior art will be briefly introduced as follows:

I. Conventional Business Policy/Rule Definition Tools and Transformation Mechanism In general, the business rule definition tools use a modeling language or a semi-natural language to express the policies or rules. Additionally, before the policies or rules are enforced, they should be transformed into executable code, such as Java, .NET, etc. Java and all Java-based trademarks are trademarks of Sun Microsystems, Inc. in the United States, other countries, or both.

The business rule definition tools, such as ILOG's JRule™ or Fair Isaac® Blaze Advisor® allow business analysts to author and manage the business rules representing business logic using structured English sentences and phrases compliant with Semantics of Business Vocabulary and Business Rules (SBVR).

The policies or rules defined by the business rule definition tools are layered as different levels, such as a business level, platform independent level, platform specific level, etc., according to a complex model driven architecture.

WebSphere Business Modeler is a business process modeling tool provided by IBM Corporation and has a function of defining the business policies/rules, wherein the business rules can be inserted into the business process. However, the tool is only in conceptual level and only generates an abstract rule framework and textual description.

WebSphere Integration Developer (WID) is an Eclipse based integrated development environment provided by IBM Corporation. It provides a development service for constructing and deploying standard-based business process applications. With the WID tool, a decision table and a rule object can be defined, wherein the decision table is the simplest format for business rule definition and the rule object will be finally implemented in Java. So the flexibility of declarative policy is lost.

The above conventional business policy/rule definition tools have the following limitations:
1. These business policy/rule definition tools generally support complex model driven architecture. Users need to manually author the policy based on rule vocabularies, and then generate the policies/rules of the different levels using the business policy/rule definition tools. As it is difficult to keep a seamless relationship between the policies/rules of the different levels, the business policy/rule definition tool intrinsically cannot perform the transformation between the different levels without losing the semantics and integrity. So the user must manually polish the generated outputs by themselves, which makes the usage of the business policy/rule definition tool complex.
2. Because the finalized policies for enforcement are expressed as executable code, such as Java or .NET program, and the business logic which reflects the business policies or rules are also embedded in the executable codes, the user must reconstruct the updated policies and transform them again when the policies need to be changed with the business requirement. As a result, the flexibility of declarative policy is lost.
3. The policies/rules generated by the above business policy/rule definition tools do not comply with the standards and thus cannot be reused.

II. Ontology Based Policy and Corresponding Definition Tools

Web Ontology Language (OWL) is an ontology standard description language recommended by World Wide Web Consortium (W3C). It is a conceptualization specification for one or more domains of knowledge related to specific industry, including OWL Lite sublanguage, OWL DL sublanguage and OWL Full sublanguage.

Semantics Web Rule Language (SWRL) is based on a combination of the OWL DL and OWL Lite sublanguages of the OWL with the Unitary/Binary Datalog RuleML sublanguages of the Rule Markup Language (RuleML). SWRL includes a high-level abstract syntax for Horn-like rules in both the OWL DL and OWL Lite sublanguages of the OWL. It provides model-theoretic semantics to provide the formal meanings for OWL ontology of the policy/rule written in this abstract syntax.

WebSphere Business Services Fabric (WBSF) is a tool provided by the IBM Corporation for supporting business domain service and service policy modeling, development and runtime support. The tool provides a mechanism that provides a dynamic assembler with the acceptable rules for selecting service endpoints. The policy conceptually declares in IF (condition) THEN (assertions) format: if the specified condition (context and content) is met, then the specified contract (in the form of combined assertions) will be produced to match the capabilities defined in the available endpoints, wherein these policies and policy assertions are expressed as the OWL elements.

However, the above ontology based policy definition tool has the following limitations:
1. The policy definition tool heavily relies on the ontology, which depends on a set of complex ontology standards, such as OWL, etc. Thus the policy definition tool is only for description of structure of concepts and objects, and the capability for describing behavior is rather weak.
2. The policy definition is only based on entities described in OWL, and the relations among these entities are not used for policy definition.
3. As all the policies are expressed as the OWL elements, the policy definition and enforcement heavily depend on the OWL engine.

III. Service Modeling Language (SML) Rule and Schematron

SML is defined by IBM, Microsoft, BEA, Intel, etc. for XML based IT service management. It provides a rich set of constructs for describing models of complex IT services and systems. The SML model is a set of interrelated XML documents. The XML documents contain information about the parts of an IT service, as well as the constraints which each part must satisfy for the IT service to function properly. The constraints can be described in two ways:
1. Schemas—constraints on the structure and content of a document in the model. SML uses a profile of XML Schema 1.0 as the schema language and also defines a set of extensions to the XML Schema to support inter-document references.
2. Rules—Boolean expressions that constrain the structure and content of a document in a model. SML uses a profile of Schematron and XPath 1.0.

The XML Schema supports a number of built-in grammar-based constraints, but it does not support a language for defining arbitrary rules for constraining the structures and contents of the documents. Schematron is an ISO standard for defining assertions concerning a set of XML documents. The SML uses a profile of the Schematron schema to add support for user-defined constraints. The SML uses XPath 1.0 (which is augmented with smlfn:deref( ) extension function) as its constraint language. The user-defined constraints can be specified using sch:assert and sch:report elements in the Schematron.

The Community Systems Management Open Source (COSMOS) resource modeling sub-project is an open source project for SML modeling and aims to provide support for building a common model to represent the information shared in a system management scenario. The project is proposing to use SML as the XML schema language to define the common model. The Service Modeling Language-Interchange Format (SML-IF) will be used to share the model components between the tools involved in a system management activity.

However, SML is only for validation of a XML document set, and generate text reports. There is no powerful expression mechanism for an action part of the policy to describe and extend the system behavior. It is difficult for users to define the policy/rule manually with SML, especially for non-IT users to define business related policy. In addition, in both the specifications and the existing policy definition tools, there is no linkage between SML and ontology.

Based on the above, all the existing tools for defining the SOA policy have limitations. A new technical solution for generating a SOA policy is needed to solve the problems in the existing tools for defining the SOA policy.

SUMMARY OF THE INVENTION

The present invention is directed to the above technical problems, and its objective is to provide a method and apparatus of generating a context model for generating a SOA policy, which can extend knowledge domains for generating the policies. In addition, the present invention also provides a method and apparatus for generating a SOA policy based on a context model, which can keep the flexibility of declarative policy and improve the usability of policy generation. By using the present invention, all types of SOA policies can be generated with semi-natural language, and the application domain knowledge of the SOA policy can be extended and the generated SOA policy can be enforced without complex ontology engine by generating the context module using the SOA metadata documents including the OWL documents. In addition, the capability of describing policy behavior can be enhanced by using the action semantic modules customized by the user to generate the action part of the SOA policy. The SOA policy generated by using the present invention can comply with the standards completely and can be used repeatedly.

A first aspect of the present invention provides a method of generating a context model for generating a Service-Oriented Architecture (SOA) policy, which comprises: collecting SOA metadata documents compliant with an application scope of the SOA policy; establishing inter-document references among the SOA metadata documents; and aggregating the SOA metadata documents based on the inter-document references to generate the context model.

A second aspect of the present invention provides a method of generating a Service-Oriented Architecture (SOA) policy based on a context model, which comprises: generating an application scope of the SOA policy; generating a context model by collecting SOA metadata documents compliant with an application scope of the SOA policy, establishing inter-document references among the SOA metadata documents, and aggregating the SOA metadata documents based on the inter-document references to generate the context model; generating an action list for the context model based on action semantic modules customized by a user; generating a condition part of the SOA policy; generating an action part of the SOA policy according to the action list; and combining the condition part and the action part of the SOA policy to generate the SOA policy.

A third aspect of the present invention provides an apparatus for generating a context model for generating a Service-Oriented Architecture (SOA) policy, which comprises: a collector that collects SOA metadata documents compliant with an application scope of the SOA policy; an inter-document reference establishing module that establishes inter-document references among the SOA metadata documents; and an aggregator that aggregates the SOA metadata documents according to the inter-document references to generate a context model.

A fourth aspect of the present invention provides an apparatus for generating a Service-Oriented Architecture (SOA) policy based on a context model, which comprises: an application scope generating module that generates an application scope of the SOA policy; an apparatus for generating a context model for generating a Service-Oriented Architecture (SOA) policy, which comprises: a collector that collects SOA metadata documents compliant with an application scope of the SOA policy; an inter-document reference establishing module that establishes inter-document references among the SOA metadata documents; and an aggregator that aggregates the SOA metadata documents according to the inter-document references to generate a context model; an action list generator that generates an action list for the context model based on action semantic modules customized by a user; a condition generator that generates a condition part of the SOA policy; an action generator that generates an action part of the SOA policy according to the action list; and a policy generator that combines the condition part and the action part to generate the SOA policy.

DETAILED DESCRIPTION OF THE INVENTION

It is believed that the above and other objectives, features and advantages of the present invention will become clearer through the following detailed description of the embodiments of the present invention in conjunction with the drawings.

Figure 1:
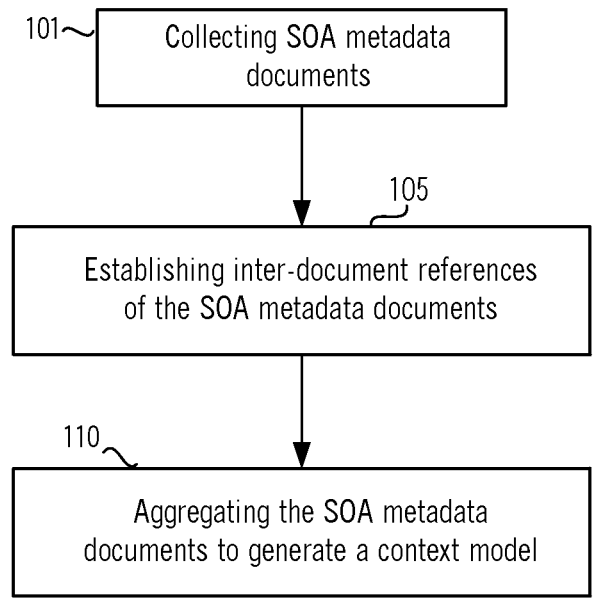
FIG. 1 is a flowchart of a method of generating a context model for generating a SOA policy according to one embodiment of the present invention.

FIG. 1 is a flowchart of a method of generating a context model for generating a SOA policy according to one embodiment of the present invention. This embodiment will be described in detail in conjunction with the figure.

As shown in FIG. 1, at Step 101, SOA metadata documents compliant with an application scope of the SOA policy are collected. As stated above, the SOA metadata documents include service metadata documents, runtime information documents or documents for describing other business contents, such as OWL documents. In this embodiment, the application scope of the policy is the domains to which the policy will be applied. The detailed content will be described later. According to the application scope of the SOA policy, the related SOA metadata documents could be collected. Before these SOA metadata documents are collected, a user can specify the eligible SOA metadata documents.

At Step 105, the collected SOA metadata documents are processed, i.e. inter-document references among the SOA metadata documents are established. The XML schema does not support the inter-document references. However, this embodiment can extend the XML schema to build the references among the XML elements in the different SOA metadata documents, for example, add a new attribute or data type to illustrate the reference of one element to another element. In this embodiment, the inter-document references can be established by establishing a unique correspondence between a Uniform Resource Identifier (URI) of each SOA metadata document and a role that is taken by the SOA metadata document. Although there may be no relation between the collected SOA metadata documents, for example, the elements defined in the WSDL documents and the elements in the runtime SOAP message, the inter-document references of a root element of each document can be built by the operation of establishing the unique correspondence as stated above, so that all the documents can be mutually referenced.

At Step 110, the SOA metadata documents are aggregated according to the inter-document references established in Step 105 to generate a context model. The SOA metadata documents without inter-document references are isolated from each other. After Step 110 is performed, all the SOA metadata documents with inter-document references can form a context so that these SOA metadata documents can rely on each other and describe a context model for generating the policy.

In this embodiment, the context model is represented as a XML document in the format of a document list. In the generated context model, the URI, the corresponding role, and element representing the inter-document reference of each SOA metadata document are listed.

Next an example of the context model is given, wherein the context model is based on XML.

```
<?xml version="1.0" encoding="UTF-8" ?>
<DocumentList xmlns:cm="http://cn.ibm.com/soa">
    <Document role="role0" cm:ref="true">
        <cm:uri>/Context Model/External_SampleService.wsdl</cm:uri>
    </Document>
    <Document role="role1" cm:ref="true">
        <cm:uri>/Context Model/Internal_SampleService.wsdl</cm:uri>
    </Document>
    <Document role="role2" cm:ref="true">
        <cm:uri>/Context Model/RequesterSOAP_1.xml</cm:uri>
```

-continued

```
  </Document>
  <Document role="role3" cm:ref="true">
    <cm:uri>/Context Model/SampleService.wsdl</cm:uri>
  </Document>
</DocumentList>
```

In this example, "Document role" represents the role taken by the document, "cm:ref" represents the inter-document reference, "cm:uri" represents the URI of the document. In this way, the context model includes four documents in which document 1 is "External_SampleService.wsdl" whose role is role 0; document 2 is "Internal_SampleService.wsdl" whose role is role 1; document 3 is "RequesterSOAP_1.xml" whose role is role 2; and document 4 is "SampleService.wsdl" whose role is role 3. The references among these four documents are shown by "cm:ref="true"".

Of course, those persons skilled in the art can understand that the context model can be based on the other executable languages which enable the SOA metadata documents to refer to each other and can describe the policies/rules for validation of the structures and contents of the SOA metadata documents.

It can be seen from the above description that the method of generating a context model for generating a SOA policy can establish relations among the related SOA metadata documents and aggregate the SOA metadata documents according to a certain format to generate the context model, thereby providing a basis of generating the SOA policy with a uniform format.

Figure 2:
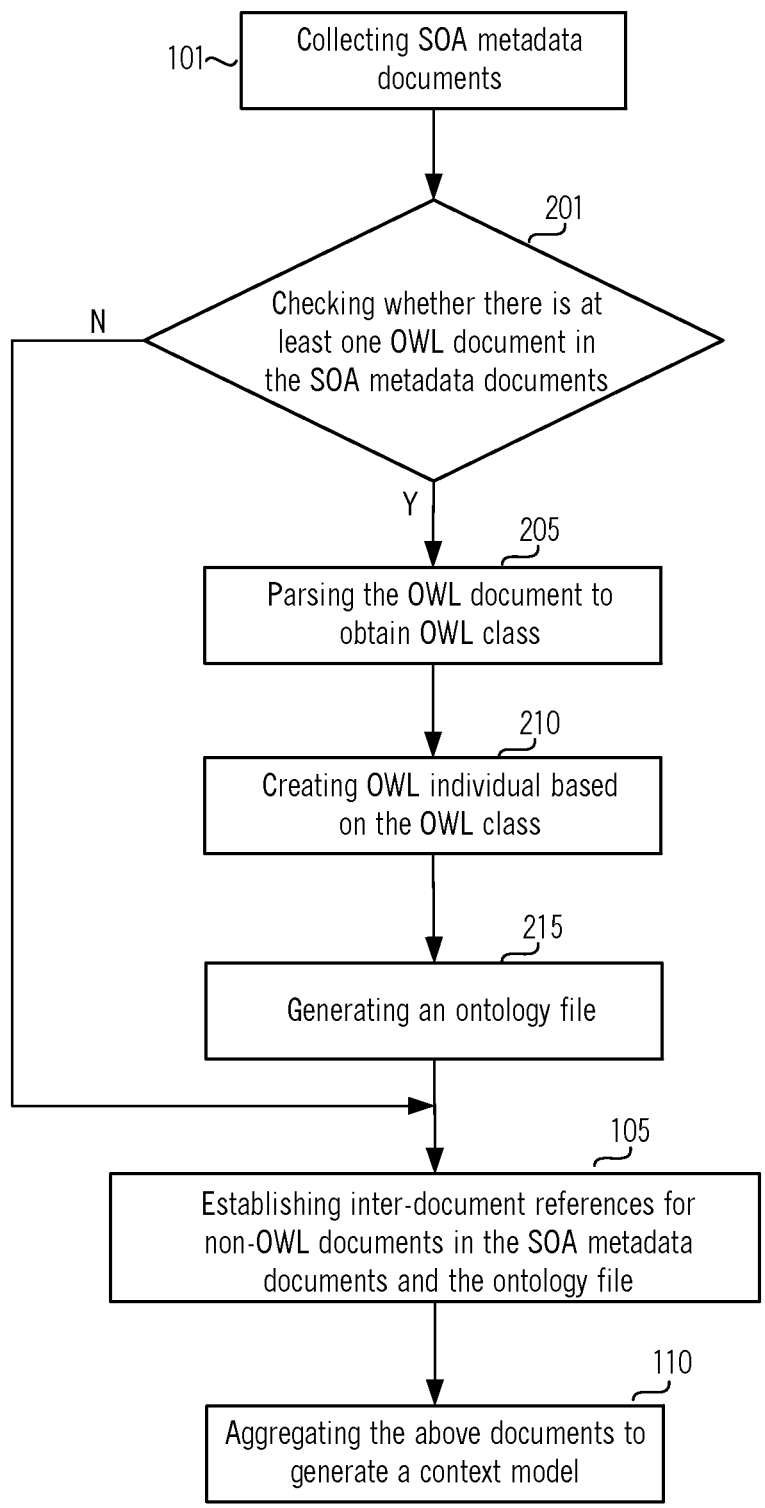
FIG. 2 is a flowchart of a method of generating a context model for generating a SOA policy according to another embodiment of the present invention.

FIG. 2 is a flowchart of a method of generating a context model for generating a SOA policy according to another embodiment of the present invention, wherein the descriptions of the portions that are the same as those of the previous embodiment are omitted. This embodiment will be described in detail as follows in conjunction with the figure.

As stated above, OWL is an ontology standard description language and describes relations between the objects with a predetermined format. OWL is developed based on XML. Compared with XML, OWL can describe semantic information. An OWL document can be regarded as a XML document containing some business semantic information.

The basic components of OWL include: class, attribute and individual (instance). The following is an example of an OWL document, wherein some business terms are described, for example, Account Size, Customer Type and Account Limit, etc. In this example, the class is represented as "owl:Class" element.

```
<owl:Class rdf:ID="AccountSize">
  <rdfs:subClassOf
    rdf:resource=
  "http:
  //www.webifysolutions.com/assertion#ContentBasedAssertion"/>
  <core:assertionType
    rdf:datatype="http://www.w3.org/2001/XMLSchema#string">
    Endpoint Selection</core:assertionType>
</owl:Class>
<owl:Class rdf:ID="CustomerType">
  <core:assertionType
    rdf:datatype="http://www.w3.org/2001/XMLSchema#string">
    Endpoint Selection</core:assertionType>
  <rdfs:subClassOf
    rdf:resource=
  "http:
  //www.webifysolutions.com/assertion#ContentBasedAssertion"/>
</owl:Class>
<owl:Class rdf:ID="AccountLimit">
  <core:assertionType
    rdf:datatype="http://www.w3.org/2001/XMLSchema#string">
    Endpoint Selection</core:assertionType>
  <rdfs:subClassOf
    rdf:resource=
  "http:
  //www.webifysolutions.com/assertion#ContentBasedAssertion"/>
  <core:contentAssertionScope
    rdf:datatype="http://www.w3.org/2001/XMLSchema#string">
    POLICY</core:contentAssertionScope>
</owl:Class>
```

Since the OWL document contains the business semantic information, during the generation of the context model, it is necessary to process the OWL document after collecting the related SOA metadata documents and before establishing the inter-document reference of each SOA metadata document.

In this embodiment, at Step 201, it is checked whether there is at least one OWL document in the collected SOA metadata documents. If there is no OWL document, Step 105 is performed. If there exists the at least one OWL document, at Step 205, each of the at least one OWL document is parsed to obtain the OWL class in the OWL document, i.e. defined by "owl:Class" in the example of the OWL document. At Step 210, based on the obtained OWL class, the corresponding OWL individual is created. In the OWL, the individual is the instance of the class. In this way, the OWL individual can be obtained by instantiating the OWL class. At Step 215, for each of the at least one OWL documents, an ontology file which contains the OWL class and the corresponding OWL individual is generated. These ontology files as well as the non-OWL documents in the SOA metadata documents will form the context model.

At Step 105, the inter-document references are established for the ontology files and the non-OWL documents in the SOA metadata documents. At Step 110, the ontology files and the non-OWL documents in the SOA metadata documents are aggregated according to the inter-document references to generate the context model.

Figure 3:
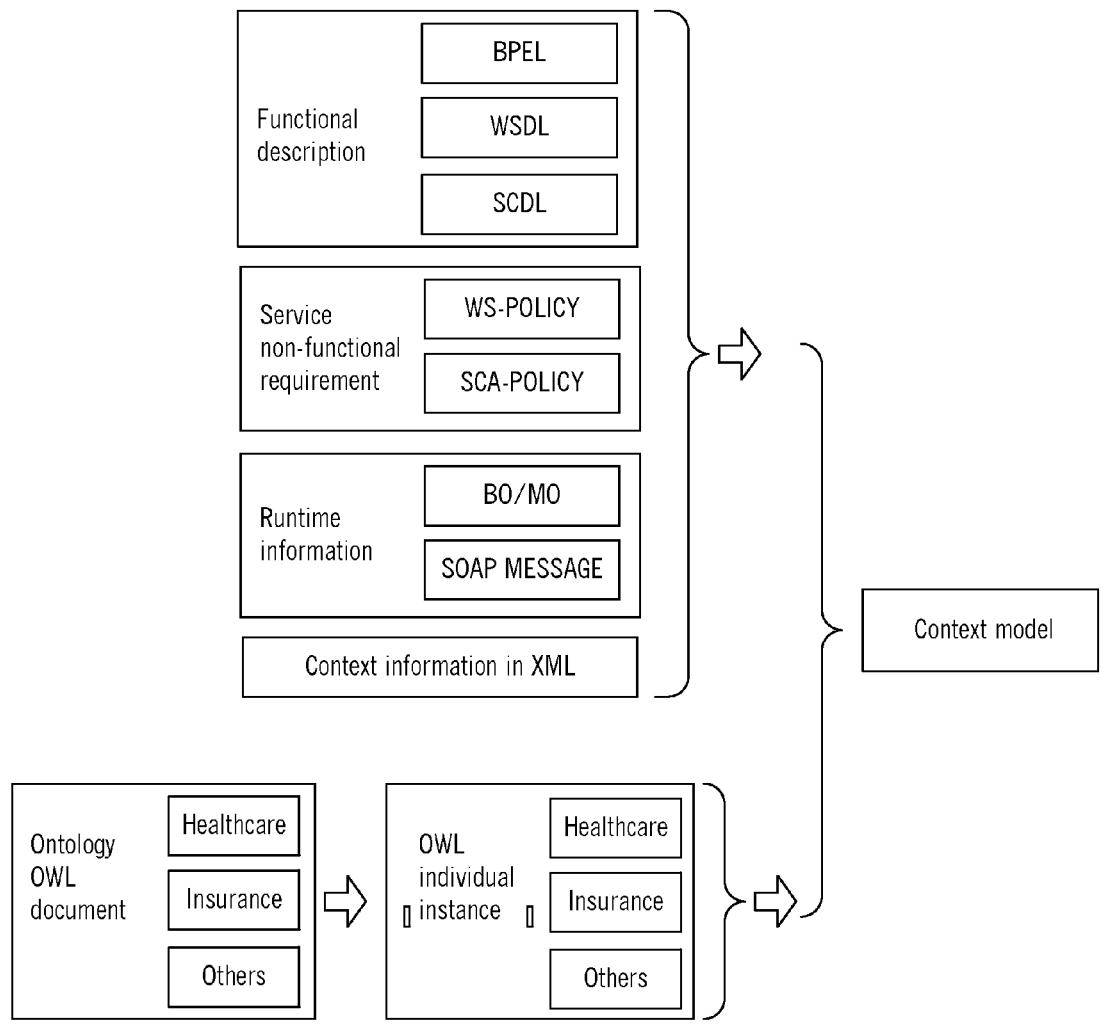
FIG. 3 is a schematic diagram of generating a context model using the SOA metadata documents in the embodiment shown in FIG. 2.

FIG. 3 shows a schematic diagram of using the SOA metadata documents to generate the context model. As shown in FIG. 3, the SOA metadata documents are the documents related to functional descriptions described by BPEL, WSDL and SCDL, the documents related to service non-functional requirements represented by WS-policy and SCA policy, the documents related to runtime information represented by Business Object/Message Object and SOAP message, the context information in XML and the OWL documents describing the ontology, such as the OWL documents describing healthcare industry, insurance industry, etc. The OWL documents are parsed and instantiated to obtain the OWL individuals (instances). Then the OWL individuals and other documents construct the context model.

It can be seen from the above description that the method of generating a context model for generating a SOA policy of this embodiment can further process the OWL documents describing the industry domains knowledge to extend the application domains knowledge of the SOA policy so that the more semantic and more complex policies can be generated.

Figure 4:
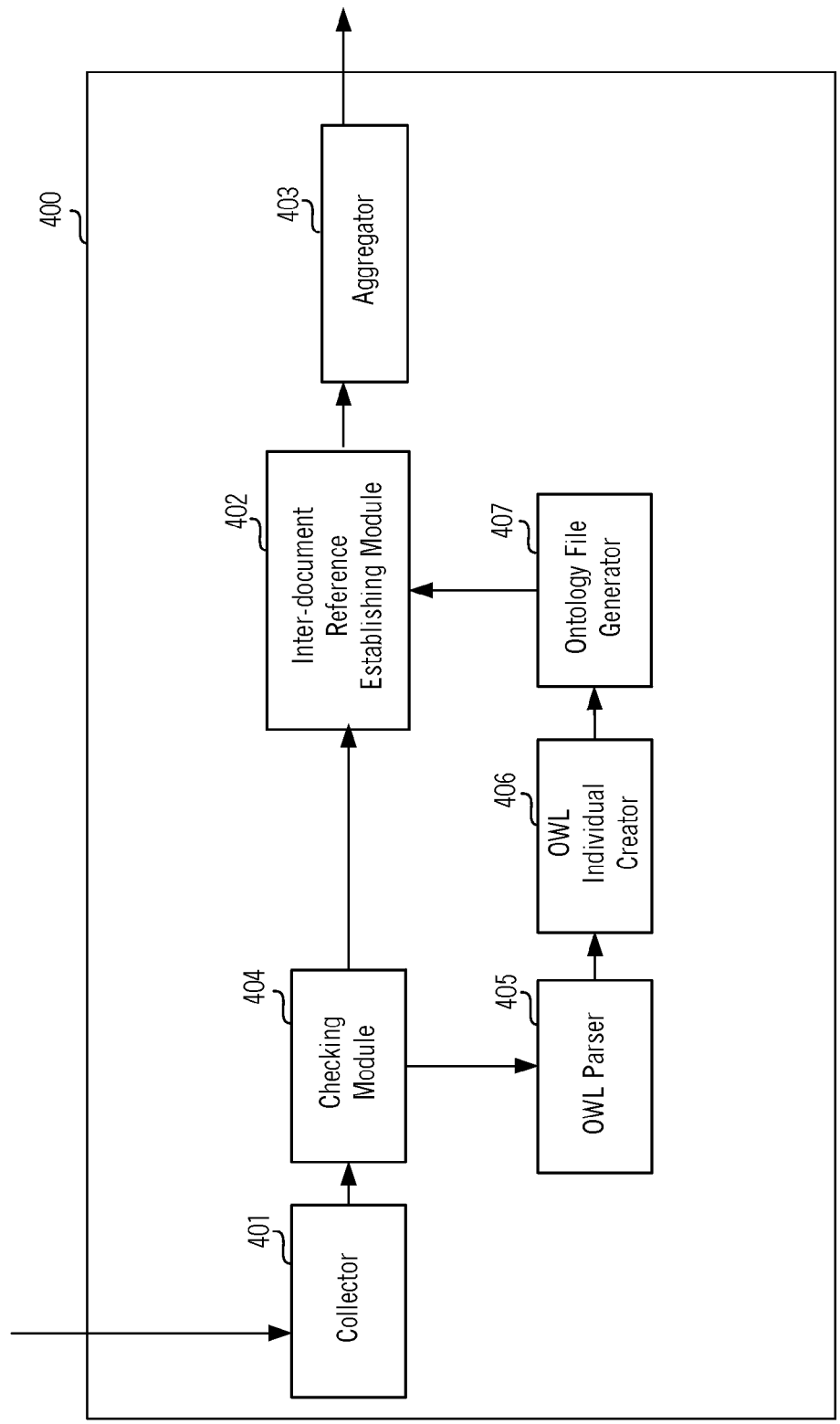
FIG. 4 is a schematic block diagram showing an apparatus for generating a context model for generating a SOA policy according to one embodiment of the present invention.

Under the same inventive concept, FIG. 4 is a schematic block diagram showing an apparatus for generating a context model for generating a SOA policy according to one embodiment of the present invention. This embodiment will be described in detail as follows in conjunction with the figure, wherein the descriptions of the portions that are same as those of the previous embodiments are omitted.

As shown in FIG. 4, the apparatus 400 for generating a context model for generating a SOA policy comprises: a collector 401, which collects SOA metadata documents compliant with an application scope of the SOA policy; an inter-document reference establishing module 402, which establishes the inter-document references among the SOA metadata documents collected by the collector 401; and an aggregator 403, which aggregates the SOA metadata documents according to the inter-document references established by the inter-document reference establishing module 402 to generate a context model.

In this embodiment, the collector 401 collects the related SOA metadata documents according to the application scope of the SOA policy, i.e. the domains to which the SOA policy is applied. Preferably, these related SOA metadata documents can be specified by a user. Accordingly, the apparatus 400 for generating a context model of this embodiment can further comprise a specifying module that allows the user to specify the SOA metadata documents compliant with the application scope of the SOA policy. The specifying module can be implemented by providing an interaction interface to the user.

Then, the collector 401 collects these SOA metadata documents together. The collected SOA metadata documents are provided to the inter-document reference establishing module 402 in which the inter-document references are established. In this embodiment, the inter-document reference establishing module 402 can comprise a correspondence establishing unit which establishes a unique correspondence between the URI of each of the SOA metadata documents and the role taken by the SOA metadata document. The role of the SOA metadata document shows the function that the document has in the context model and provides the element for generating the policy. The inter-document reference of the root element of each SOA metadata document can be established by establishing the unique correspondence. In addition, other elements in the SOA metadata document can use the relative paths to the root element to describe their locations. In this way, the mutual references among the elements in the SOA metadata document can be established so that the SOA metadata documents can be mutually referenced.

Then, the aggregator 403 aggregates the SOA metadata documents as the context model according to the established inter-document references. In this embodiment, the context model is represented as a XML document in the format of document list. In the generated context model, the URI and the corresponding role of each SOA metadata document are listed.

Figure 5:
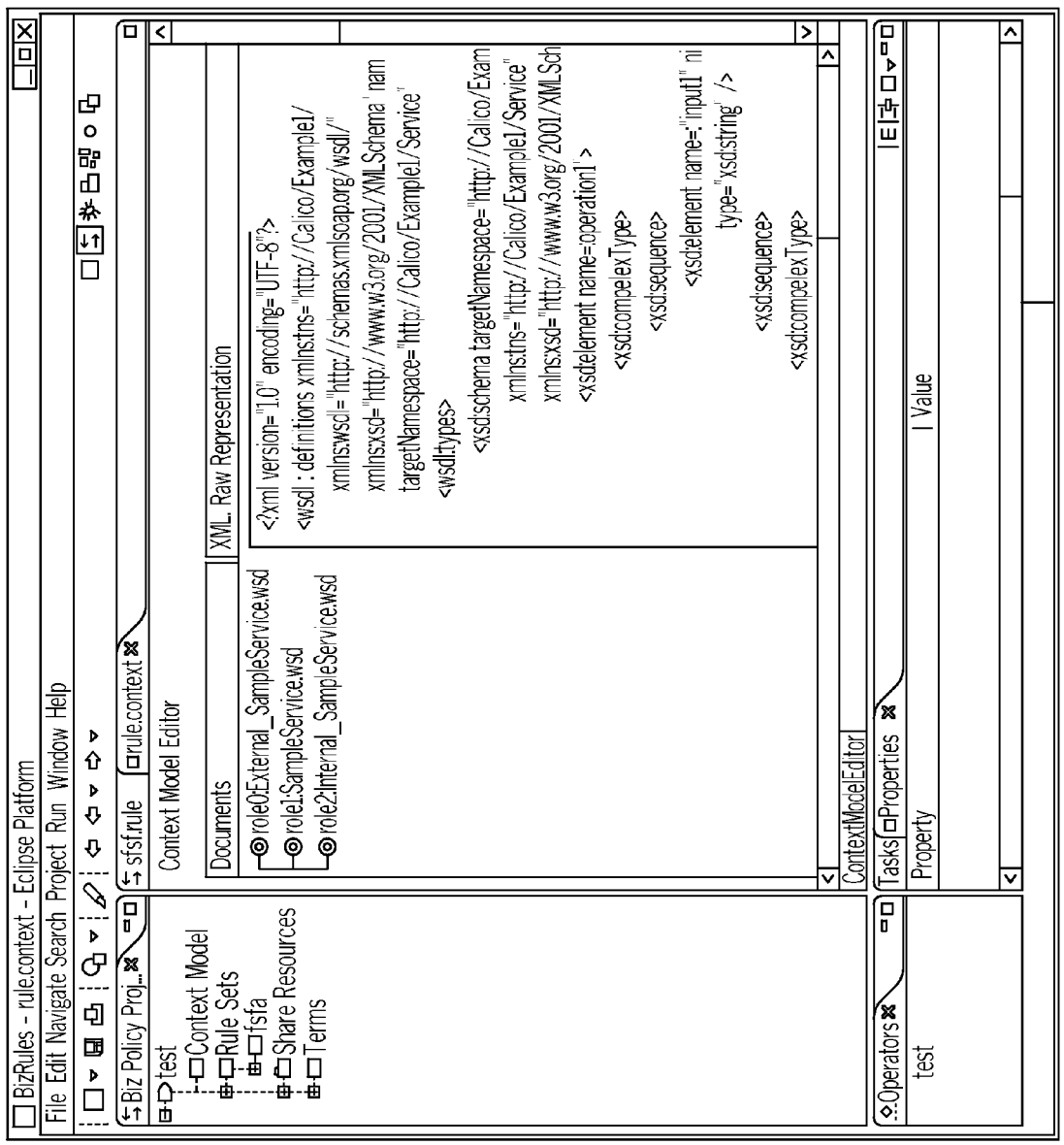
FIG. 5 is a schematic diagram showing an implementation on an Eclipse platform of the aggregator in FIG. 4.

FIG. 5 is a schematic diagram showing an implementation on an Eclipse platform of the aggregator 403 in FIG. 4. As shown in FIG. 5, the generated XML based context model is shown in the left column of "Context Model Editor", wherein the correspondences between the roles and the URIs are listed.

Returning to FIG. 4, the apparatus 400 of generating a context model for generating a SOA policy of this embodiment also comprises: a checking module 404, which checks whether there is at least one OWL document in the SOA metadata documents collected by the collector 401; an OWL parser 405, which parses the at least one OWL document to obtain the OWL class of each of the at least one OWL document; an OWL individual creator 406, which creates a corresponding OWL individual according to the OWL class obtained by the OWL parser 405; and an ontology file generator 407, which generates an ontology file containing the OWL class and the corresponding OWL individual for each of the at least one OWL document.

In this way, each OWL document is processed by the OWL parser 405, the OWL individual creator 406 and the ontology file generator 407 to obtain the corresponding ontology file.

These ontology files are used to generate the context model together with the non-OWL documents in the SOA metadata documents. In this embodiment, the ontology files and the non-OWL documents in the SOA metadata documents are provided to the inter-document reference establishing module 402 to establish the inter-document references, and then the aggregator 403 aggregates the non-OWL documents in the SOA metadata documents and the ontology files according to the established inter-document references to generate the context model.

It should be noticed that the apparatus 400 for generating a context model for generating a SOA policy and its components can be implemented by: a hardware circuit, such as Very Large Scale Integrated Circuit or gate array; a semiconductor such as logic chips and transistors; a programmable hardware device, such as field programmable gate array; a programmable logic device; by software executed on various types of processors; or by a combination of above hardware circuit and software. Also, the apparatus 400 for generating a context model for generating a SOA policy of this embodiment may operationally realize the method of generating a context model for generating a SOA policy of the embodiment shown in FIG. 1.

It can be seen from the above description that the apparatus for generating a context model for generating a SOA policy of this embodiment can establish relations among the related SOA metadata documents and aggregate them as the context model, thereby providing a basis of generating the SOA policy with a uniform format. In addition, the apparatus for generating a context model for generating a SOA policy of this embodiment can further process the OWL documents describing the industry domain knowledge to extend the application domain knowledge of the SOA policy so that the more semantic and more complex SOA policies can be generated.

Figure 6:
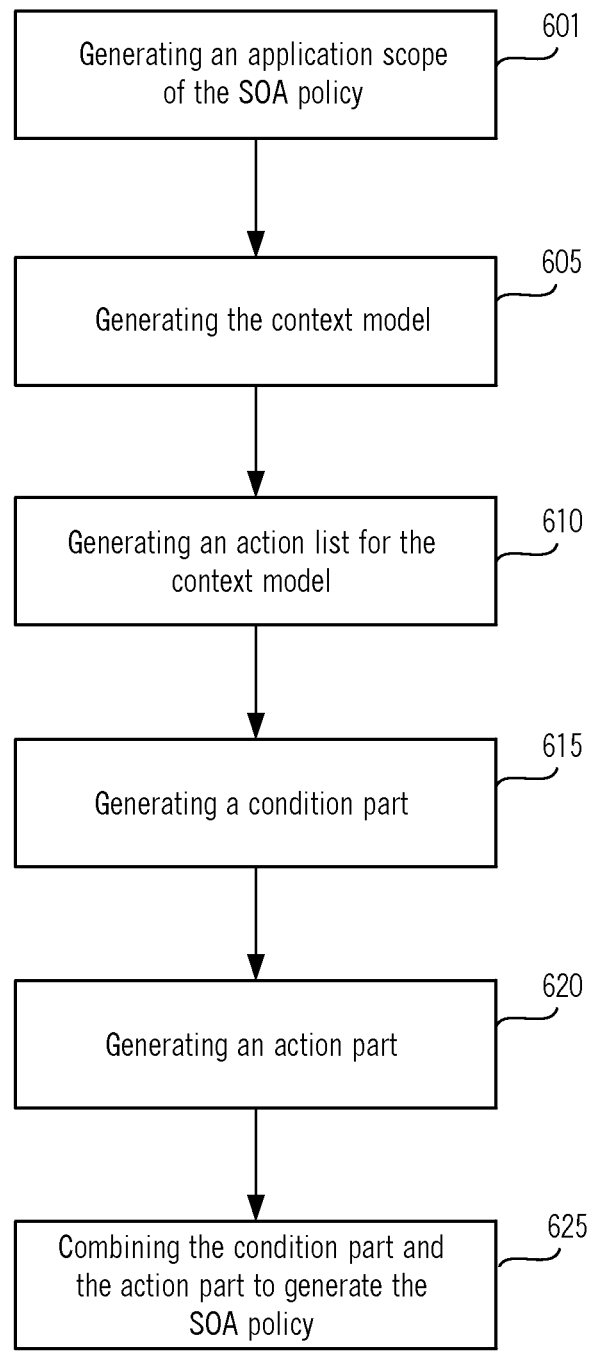
FIG. 6 is a flowchart of a method of generating a SOA policy based on a context model according to one embodiment of the present invention.

Under the same inventive concept, FIG. 6 is a flowchart of a method of generating a SOA policy based on a context model according to one embodiment of the present invention, wherein the descriptions of the portions that are the same as those of the previous embodiments are omitted. This embodiment will be described in detail as follows in conjunction with the figure.

As shown in FIG. 6, at Step 601, an application scope of the SOA policy to be generated is generated. As stated above, the application scope of the SOA policy is the domains to which the SOA policy will be applied. The application scope of the SOA policy can be the type of the SOA policy, i.e. the SOA policy can be a business policy, application policy or governance policy. Also, the application scope of the SOA policy can be the application scenario to which the SOA policy is applied, for example, account management, etc. Also the application scope of the SOA policy can be combination of the policy type and the application scenario.

At Step 605, according to the generated application scope of the SOA policy, the SOA metadata documents compliant with the application scope of the SOA policy are aggregated as the context model by using the method of generating a context model for generating a SOA policy of the embodiments shown in FIG. 1 or 2. In this embodiment, XML is selected to implement the context model.

At Step 610, an action list for the context model generated in Step 605 is generated based on action semantic modules customized by a user.

In this embodiment, the user can customize the required action semantic modules. These action semantic modules could be in any format. However, for the action semantic modules in non-XML format, corresponding XML description files should be provided. The XML description file describes information about formats, interfaces and invoking modes of the action semantic module. The user can store the customized action semantic modules in a specific location. The action semantics of the policy can be extended through the customization of the action semantic modules by the user.

Then the action semantic modules and their XML description files are obtained and the XML description files are read to obtain the related information of the action semantic modules. With the related information, the action semantic modules are introduced into the action list.

After the context model and the corresponding action list are built, at Step 615, a condition part of the SOA policy is generated according to the structures and contents of the SOA metadata documents in the context model to construct the environment in which some actions are to be enforced. Generally, the condition part is expressed as a logic expression or the composition of logic expressions. For example, the logic expression as the condition part may be shown as follows:

((<Left Term> <Operator> <Right Term> A)
and (<Left Term> <Operator> <Right Term> B)
or (<Left Term> <Operator> <Right Term> C))

In this embodiment, condition terms and the relations among the conditions terms, such as inheritance relation, association relation, etc., are extracted from the SOA metadata documents in the context model. These condition terms are candidates for "Left Term" and "Right Term" of the condition part. In addition, the "Right Term" could be a value. Then these condition terms are displayed and the user selects the required condition terms and operators to construct the condition part.

At Step 620, an action part of the SOA policy is generated according to the action list generated in Step 610. In this embodiment, all the action semantic modules in the action list are displayed. The user can select the required action semantic modules according to the condition part of the policy and set parameters in the action semantic modules, thus the action part is generated. The action part can be expressed as a formatted string or an executable framework to invoke the action semantic module.

Finally, at Step 625, the condition part and the action part generated in Steps 615 and 620 respectively are combined to generate the SOA policy. The generated SOA policy is a condition-action policy, in which the condition part represents the matching criteria of the structures and contents of the SOA metadata documents in the context model and the action part has the extendable action semantics. For example, if the context model uses the XML syntax, the SOA policy can use Schematron as the basic syntax.

Figure 7:
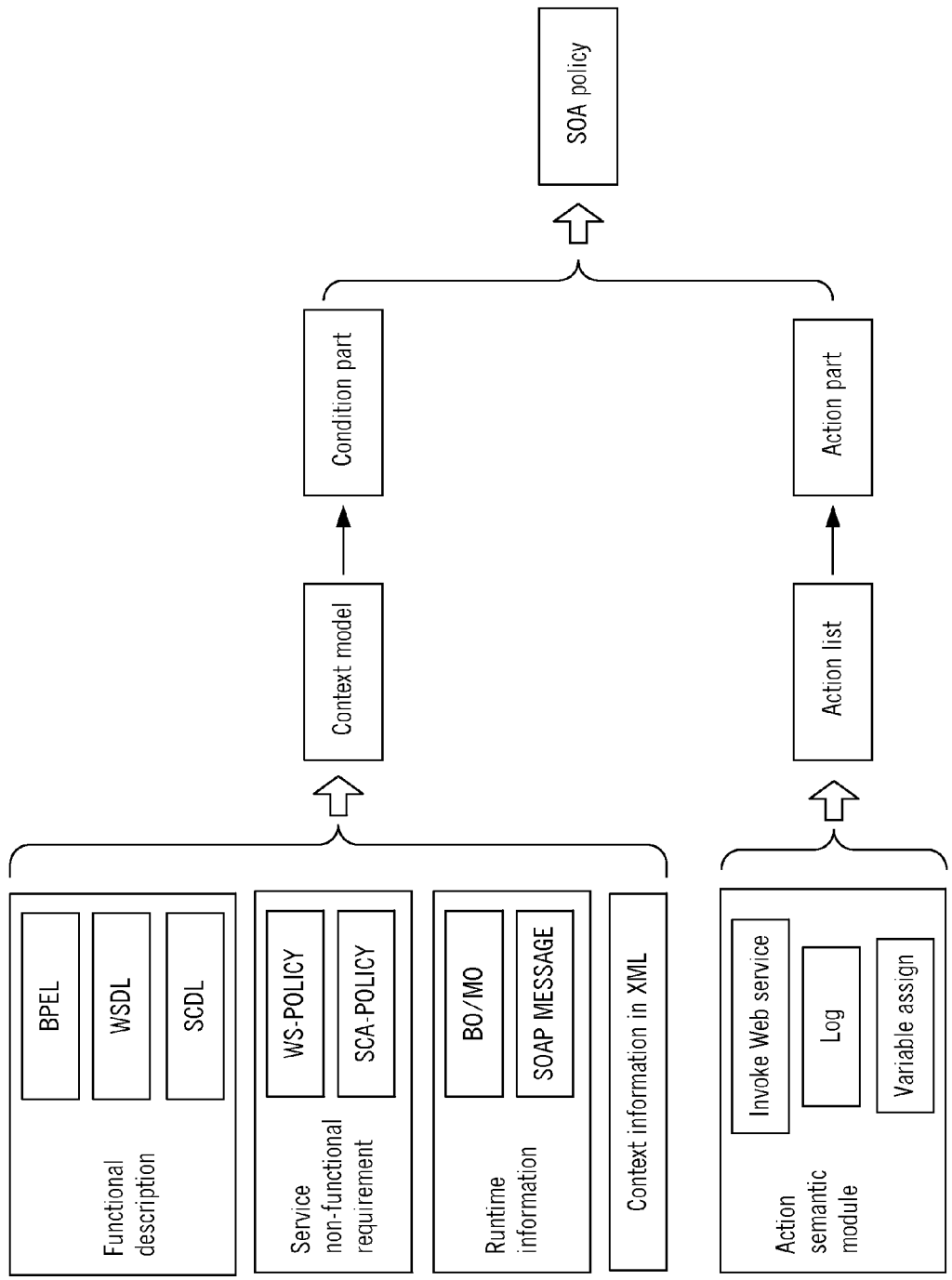
FIG. 7 is a schematic diagram showing a process of generating a SOA policy in FIG. 6.

FIG. 7 schematically shows a process of generating the SOA policy. As shown in FIG. 7, the SOA metadata documents are aggregated as the context model, and then the condition part of the SOA policy is generated according to the context model. Additionally, the customized action semantic modules, such as invoke one Web service, log, assign value to variable, etc., are used to generate the action part of the SOA policy. Finally, the condition part and the action part are combined to form the SOA policy.

In addition, the method of generating a SOA policy based on a context model of this embodiment further comprises generating a context model template that includes the context model generated in Step 605 and the SOA metadata documents in the context model. Further, the context model template and the generated SOA policy are registered in a Policy Registry/Repository of a SOA system for future policy enforcement.

Next an example of a supply chain ontology OWL document and runtime metadata and an example of the generated SOA policy are given.

```
<?xml version="1.0"?>
<rdf:RDF
    xmlns="http://www.owl-ontologies.com/Ontology1179712883.owl#"
    xmlns:rdf="http://www.w3.org/1999/02/22-rdf-syntax-ns#"
    xmlns:xsd="http://www.w3.org/2001/XMLSchema#"
    xmlns:rdfs="http://www.w3.org/2000/01/rdf-schema#"
    xmlns:owl="http://www.w3.org/2002/07/owl#"
    xmlns:p1="http://www.owl-ontologies.com/"
    xml:base=
    "http://www.owl-ontologies.com/Ontology1179712883.owl">
  <owl:Ontology rdf:about=""/>
  <owl:Class rdf:ID="CustomerType"/>
  <owl:Class rdf:ID="Discount"/>
  <owl:DatatypeProperty rdf:ID="hasLiteralValue">
      <rdfs:domain rdf:resource="#CustomerType"/>
  </owl:DatatypeProperty>
  <owl:ObjectProperty rdf:ID="hasDiscount">
      <rdfs:range rdf:resource="#Discount"/>
      <rdfs:domain rdf:resource="#CustomerType"/>
  </owl:ObjectProperty>
  <owl:DatatypeProperty rdf:ID="hasDecimalValue">
      <rdfs:domain rdf:resource="#Discount"/>
  </owl:DatatypeProperty>
```

The above example is an OWL document describing the business terms such as CustomerType, Discount, etc., wherein the OWL classes include "CustomerType" and "Discount", and the data type attribute of the "CustomerType" class is "hasLiteralValue", the "CustomerType" class and the "Discount" class have the object attribute "hasDiscount", and the data type attribute of the "Discount" class is "hasDecimalValue".

The OWL individual defining the instance of different customer type and its discount is shown as follows. The OWL individual indicates that the "Discount" is "0.66" when the "CustomerType" is "GOLDEN", the "Discount" is "0.77" when the "CustomerType" is "SILVER", and the "Discount" is "0.88" when the "CustomerType" is "BRONZE".

```
<CustomerType rdf:ID="GOLDEN">
    <hasLiteralValue
        df:datatype="http://www.w3.org/2001/XMLSchema#string">
        GOLDEN</hasLiteralValue>
    <hasDecimalValue
        rdf:datatype="http://www.w3.org/2001/XMLSchema#double">
        0.66</hasDecimalValue>
</CustomerType>
<CustomerType rdf:ID="SILVER">
    <hasLiteralValue
        rdf:datatype="http://www.w3.org/2001/XMLSchema#string">
        SILVER</hasLiteralValue>
    <hasDecimalValue
        rdf:datatype="http://www.w3.org/2001/XMLSchema#double">
        0.77</hasDecimalValue>
</CustomerType>
<CustomerType rdf:ID="BRONZE">
    <hasLiteralValue
        rdf:datatype="http://www.w3.org/2001/XMLSchema#string">
        BRONZE</hasLiteralValue>
    <hasDecimalValue
        rdf:datatype="http://www.w3.org/2001/XMLSchema#double">
        0.88</hasDecimalValue>
</CustomerType>
</rdf:RDF>
```

The following XML document is the runtime metadata that covers the customer information such as customer type (customerType) and customer name (customerName).

```
<?xml version="1.0" encoding="UTF-8" ?>
<Customer xmlns:xsi="http://www.w3.org/2001/XMLSchema-instance"
    xmlns:biz="http://BizRuleDemo">
    <customerType>SILVER</customerType>
    <customerName>wxn</customerName>
</Customer>
```

The following XML document is the runtime metadata for defining the discount information according to the dynamic customer type.

```
<?xml version="1.0" encoding="UTF-8" ?>
<Discount xmlns:xsi="http://www.w3.org/2001/XMLSchema-instance"
    xmlns:biz="http://BizRuleDemo">
    <discount>0.9</discount>
</Discount>
```

The above OWL class, OWL ontology and XML documents are aggregated as the context model. The following policy can be constructed based on the business semantics of the ontology terms, wherein the condition part and the action part are shown in bold respectively and the action semantic module is value assignment action. The semantics of the policy describes that different discount value is assigned according to the customer type from the dynamic runtime context.

```
<?xml version="1.0" encoding="UTF-8"?>
<schema xmlns="http://www.ascc.net/xml/schematron"
    xmlns:cm="http://contentmodel">
    <title>route_policy</title>
    <ns uri="http://schemas.xmlsoap.org/wsdl/" prefix="wsdl" />
    <ns uri="http:// contentmodel " prefix="fn" />
    <ns uri="http://com.ibm.biz.policy/context/" prefix="ctx" />
    <ns uri="http://schemas.xmlsoap.org/wsdl/soap/" prefix="wsdlsoap" />
    <pattern name="rule name">
        <rule context="/ctx:Context/ctx:DocumentList">
            <report id="endpoint0"
test="fn:deref(ctx:Document[@role=
'role1'])//*/CustomerType/hasLiteralValue/text( ) =
fn:deref(ctx:Document[@role='role2'])/customerType/text( )">
                Assign{ fn:deref(ctx:Document[@role='role3'])/discount/text( ) =
fn:deref(ctx:Document[@role=
'role1'])//*/CustomerType/hasDecimalValue/text( )}
            </report>
        </rule>
    </pattern>
</schema>
```

It can be seen from the above description that the method of generating a SOA policy based on a context model can generate all types of SOA policies with semi-natural language and extend application domain knowledge of the SOA policy by extracting the condition terms for generating the SOA policy from the SOA metadata documents. This embodiment enables the generated SOA policy to be enforced without a complex ontology engine by processing the OWL documents. In addition, the capability of describing the policy behavior can be enhanced by using the action semantic modules customized by the user to generate the action part of the SOA policy. The SOA policy generated using the method of this embodiment is compliant with the standards completely and can be used repeatedly.

Figure 8:
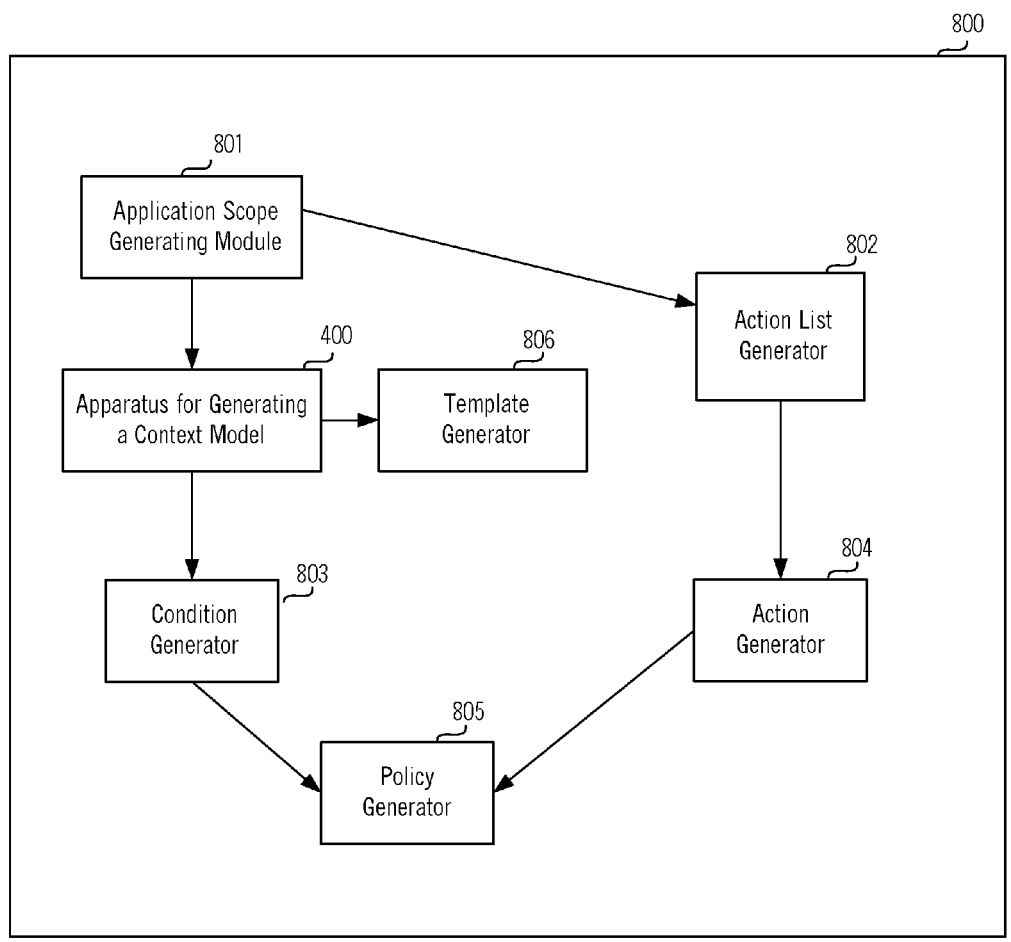
FIG. 8 is a schematic block diagram showing an apparatus for generating a SOA policy based on a context model according to one embodiment of the present invention.

Under the same inventive concept, FIG. 8 is a schematic block diagram showing an apparatus for generating a SOA policy based on a context model according to one embodiment of the present invention, wherein the descriptions of the portions which are same as those of the previous embodiment are omitted properly. This embodiment will be described in detail as follows in conjunction with the figure.

As shown in FIG. 8, the apparatus 800 for generating a SOA policy based on a context model comprises: an application scope generating module 801, which generates an application scope of the SOA policy; the apparatus 400 for generating a context model for generating a SOA policy as shown in FIG. 4, which generates the context model according to the application scope generated by the application scope generating module 801; an action list generator 802, which generates an action list for the context model based on action semantic modules customized by a user; a condition generator 803, which generates a condition part of the SOA policy according to the generated context model; an action generator 804, which generates an action part of the SOA policy according to the generated action list; and a policy generator 805, which combines the condition part and the action part of the SOA policy to generate the SOA policy.

In this embodiment, the user who needs to generate a SOA policy uses the application scope generating module 801 to generate the application scope of the SOA policy, which includes the policy type and/or application scenario. The application scope generating module 801 can be implemented as a user interaction interface. Then the corresponding context model is generated in the apparatus 400 for generating the context model according to the generated application scope of the SOA policy.

Then, the user customizes the corresponding action semantic modules according to the requirements. As stated above, the action semantic module can be in any format. For an action semantic module in non-XML format, the corresponding XML description file should be provided. The XML description file describes the related information of the action semantic module, such as formats, interfaces and invoking modes, etc. The action semantic modules customized by the user can be stored into a specific location. Then the action list generator 802 generates an action list according to the action semantic modules. In this embodiment, in the action list generator 802, first an obtaining unit obtains the customized action semantic modules and their XML description files, then a reading unit reads the XML description files to obtain the related information, and an introducing unit introduces the action semantic modules into the action list according to the information to generate the action list.

According to the generated context model, the condition generator 803 generates the condition part of the SOA policy. As stated above, the condition part can be expressed as a logic expression or a composition of the logic expressions. In this embodiment, in the condition generator 803, an extracting unit extracts the condition terms and the relations between the conditions terms, such as inheritance relation, association relation, etc., from the SOA metadata documents in the context model. The condition terms are candidates for items at the two sides of the operators in the logic expression and the items at the right side of the operators can be values. Then, the condition terms are displayed in a condition term displaying unit so that the user can use the selecting unit to select the required condition terms and operators to generate the condition part of the SOA policy.

Figure 9:
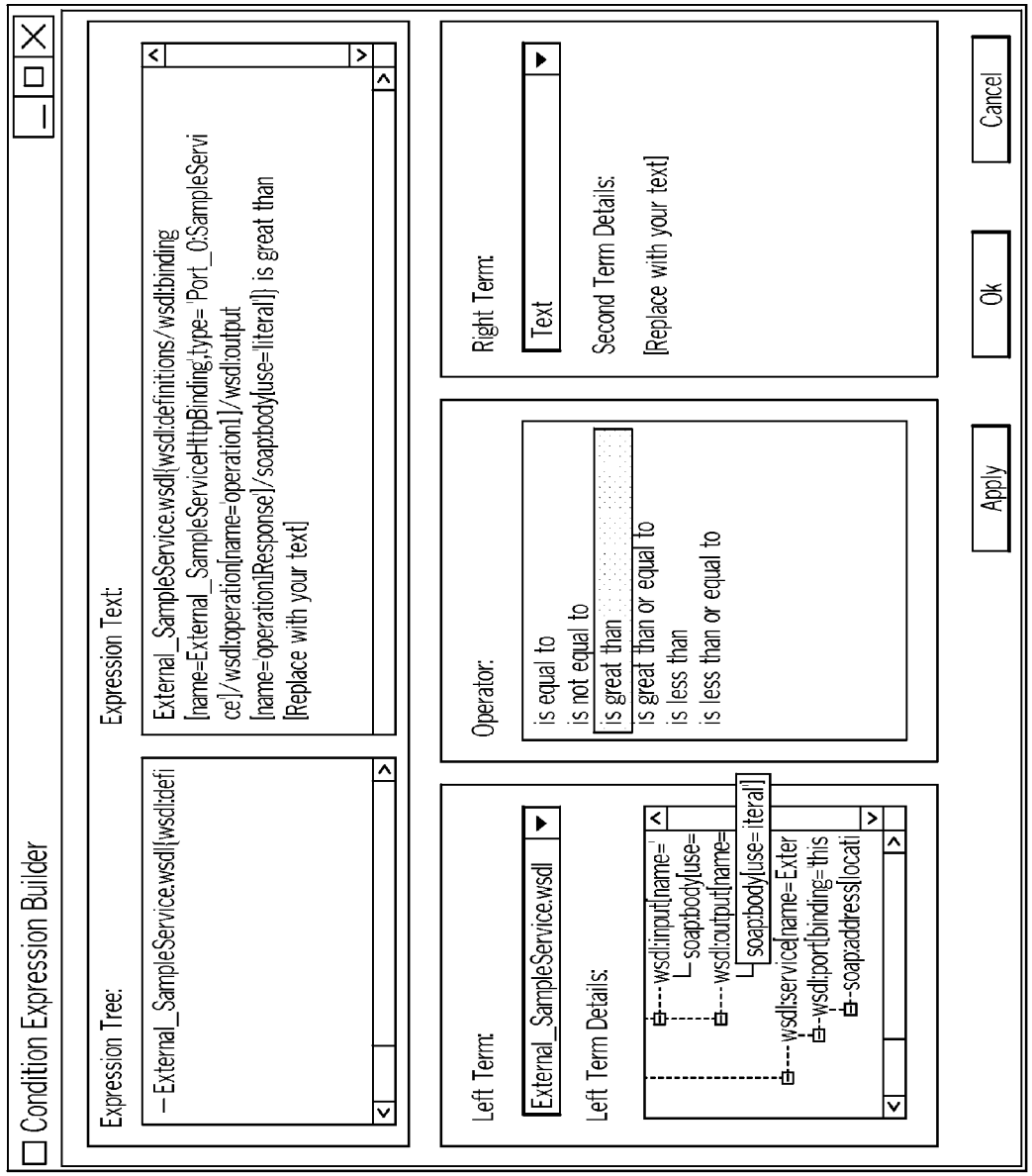
FIG. 9 is a schematic diagram showing the condition generator in FIG. 8.

FIG. 9 is a schematic diagram showing an example of the condition generator 803 in the embodiment of FIG. 8. In this example, the expression of the condition part is constructed based on the XPath and XML syntax. As shown in FIG. 9, the expression of the condition part contains "Left Term", "Operator" and "Right Term."

Returning to FIG. 8, after the condition generator 803 generates the condition part of the SOA policy, the action generator 804 generates the corresponding action part of the SOA policy according to the action list. In this embodiment, in the action generator 804, a module displaying unit displays all the action semantic modules in the action list. Then the user uses a module selecting unit to select the required action semantic modules and sets the parameters in the action semantic modules by a parameter setting unit.

Figure 10:
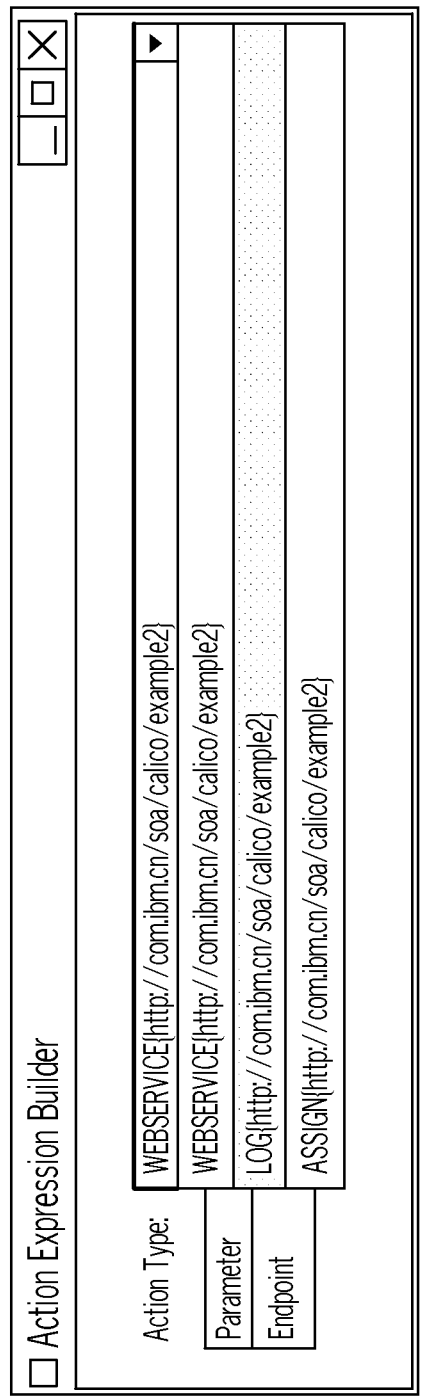
FIG. 10 is a schematic diagram showing the action generator in FIG. 8.

FIG. 10 is a schematic diagram showing an example of the action generator 804 in the embodiment of FIG. 8. As shown in FIG. 10, all the action semantic modules are displayed in the "Action Type" by using a menu. These action semantic modules are "WEBSERVICE" for invoking one Web service, "LOG" for a log operation and "ASSIGN" for assigning values to variables.

Returning to FIG. 8, the apparatus 800 for generating a SOA policy based on a context model of this embodiment can also include a template generator 806, which generates a context model template including the context model and the SOA metadata documents. The context model template and the generated SOA policy are registered in the Policy Registry/Repository of the SOA system for future policy enforcement.

It should be noticed that the apparatus 800 for generating a SOA policy based on a context model and its components can be implemented by: a hardware circuit, such as Very Large Scale Integrated Circuit or gate array; a semiconductor, such as logic chips and transistors; a programmable hardware device, such as a field programmable gate array; a programmable logic device; by software executed on various types of processors; or by a combination of the above hardware circuit and software. Also, the apparatus 800 for generating a SOA policy based on a context model of this embodiment may operationally realize the method for generating a SOA policy based on a context model of the embodiment shown in FIG. 6.

The apparatus for generating a SOA policy based on a context model of this embodiment can be plugged into the existing SOA application assembly development environment.

Although the method and apparatus for generating a context model for generating a SOA policy and the method and apparatus for generating a SOA policy based on a context model are described in detail in conjunction with the preferred embodiment, the present invention is not limited as above. It should be understood for persons skilled in the art that the above embodiments may be varied, replaced or modified without departing from the spirit and the scope of the present invention.

What is claimed is:

1. A method for generating a Service-Oriented Architecture (SOA) policy based on a context model, comprising:
generating, by a computer hardware system, an application scope of the SOA policy;
generating, by the computer hardware system, the context model by
collecting SOA metadata documents compliant with the application scope of the SOA policy,
establishing inter-document references among the SOA metadata documents, and
aggregating the SOA metadata documents based on the inter-document references to generate the context model;
generating, by the computer hardware system, an action list for the context model based on action semantic modules customized by a user;
generating, by the computer hardware system, a condition part of the SOA policy;
generating, by the computer hardware system, an action part of the SOA policy according to the action list; and
combining, by the computer hardware system, the condition part and the action part of the SOA policy to generate the SOA policy wherein
the inter-document references causes the SOA metadata documents to be mutually referenced.

2. The method of claim 1, wherein
the application scope includes at least one of: a policy type or a policy application scenario.

3. The method of claim 1, wherein
the generating the action list for the context model includes:
obtaining the action semantic modules customized by the user and their XML description files;
reading the XML description files; and
introducing the action semantic modules into the action list according to the XML description files.

4. The method of claim 1, wherein
the generating the condition part of the SOA policy includes:
extracting condition terms and their relations from the SOA metadata documents in the context model;
displaying the condition terms; and
selecting the condition terms and operators to generate the condition part.

5. The method of claim 1, wherein
the generating the action part of the SOA policy according to the action list includes:
displaying the action semantic modules in the action list;
selecting required action semantic modules; and
setting parameters in the required action semantic modules.

6. The method according to claim 1, further comprising
generating a context model template including the context model and the SOA metadata documents.

7. The method of claim 6, further comprising
registering the context model template and the SOA policy with a policy manager.

8. A computer hardware apparatus for generating a Service-Oriented Architecture (SOA) policy based on a context model, comprising:
an application scope generating module configured to generate an application scope of the SOA policy;
a processor configured to generate the context model for generating a Service-Oriented Architecture (SOA) policy, the processor including:
a collector configured to collect SOA metadata documents compliant with the application scope of the SOA policy;
an inter-document reference establishing module configured to establish inter-document references among the SOA metadata documents; and
an aggregator configured to aggregate the SOA metadata documents according to the inter-document references to generate a context model;
an action list generator configured to generate an action list for the context model based on action semantic modules customized by a user;
a condition generator configured to generate a condition part of the SOA policy;

an action generator configured to generate an action part of the SOA policy according to the action list; and a policy generator configured to combine the condition part and the action part to generate the SOA policy wherein the inter-document references causes the SOA metadata documents to be mutually referenced.

9. The computer hardware apparatus of claim 8, wherein the action list generator includes:

an obtaining unit configured to obtain the action semantic modules customized by the user and the user's XML description files;

a reading unit configured to read the XML description files; and an introducing unit configured to introduce the action semantic modules into the action list according to the XML description files.

10. The computer hardware apparatus of claim 8, wherein the condition generator includes:

an extracting unit configured to extract condition terms from the SOA metadata documents in the context model;

a condition term displaying unit configured to display the condition terms; and a selecting unit configured to select the condition terms and operators to generate the condition part.

11. The computer hardware apparatus of claim 8, wherein the action generator comprises:

a module displaying unit configured to display the action semantic modules in the action list;

a module selecting unit configured to select required action semantic modules; and a parameter setting unit configured to set parameters in the action semantic modules.

12. The computer hardware apparatus of claim 8, further comprising a template generator configured to generate a context model template including the context model and the SOA metadata documents.

* * * * *